US009605556B2

(12) United States Patent
Hoffmann et al.

(10) Patent No.: US 9,605,556 B2
(45) Date of Patent: Mar. 28, 2017

(54) POWER STATION AND METHOD FOR ITS OPERATION

(75) Inventors: Jürgen Hoffmann, Untersiggenthal (CH); Thomas Meindl, Kirchdorf (CH)

(73) Assignee: General Electric Company, Schenectady, NY (US)

( * ) Notice: Subject to any disclaimer, the term of this patent is extended or adjusted under 35 U.S.C. 154(b) by 1618 days.

(21) Appl. No.: 12/541,460

(22) Filed: Aug. 14, 2009

(65) Prior Publication Data

US 2010/0031670 A1 Feb. 11, 2010

Related U.S. Application Data

(63) Continuation of application No. PCT/EP2008/051596, filed on Feb. 11, 2008.

(30) Foreign Application Priority Data

Feb. 14, 2007 (CH) ........................................ 245/07
Feb. 14, 2007 (CH) ........................................ 247/07

(51) Int. Cl.
| | | |
|---|---|---|
| *F02C 9/00* | (2006.01) | |
| *F01D 15/10* | (2006.01) | |
| *F02C 9/28* | (2006.01) | |
| *F02C 9/38* | (2006.01) | |

(52) U.S. Cl.
CPC ............... *F01D 15/10* (2013.01); *F02C 9/28* (2013.01); *F02C 9/38* (2013.01);
(Continued)

(58) Field of Classification Search
CPC .... F02C 5/02; F02C 7/36; F01D 15/10; F05D 2270/024; F05D 2270/05
(Continued)

(56) References Cited

U.S. PATENT DOCUMENTS 4,219,738 A    8/1980   Griesinger
4,786,852 A    11/1988  Cook
(Continued)

FOREIGN PATENT DOCUMENTS

AU    785125 B2    10/2002
CN    1357965 A    7/2002
(Continued)

OTHER PUBLICATIONS

Offringa, L.L.J. and Duarte, J.L. "A 1600 Kw IGBT Converter With Interphase Transformer for High Speed Gas Turbine Power Plants" Proc. IEEE—IAS Conf. 2000, 4, Oct. 8-12, 2000, Rome, 2000, pp. 2243-2248.
(Continued)

*Primary Examiner* — Lindsay Low
*Assistant Examiner* — Omar Morales
(74) *Attorney, Agent, or Firm* — GE Global Patent Operation; Marc A. Vivenzio

(57) ABSTRACT

A power station (10) is provided having a turbine shafting (11) including a gas turbine (12) and a generator (18) which is driven directly by the gas turbine (12), produces alternating current at an operating frequency and whose output is connected to an electrical grid (21) with a predetermined grid frequency. An electronic decoupling apparatus or a variable electronic gearbox (27) is arranged between the generator (18) and the electrical grid (21), and decouples the operating frequency from the grid frequency.

53 Claims, 9 Drawing Sheets

(52) U.S. Cl.
CPC .... *F05D 2270/024* (2013.01); *F05D 2270/05* (2013.01); *F05D 2270/08* (2013.01)

(58) Field of Classification Search
USPC ......... 60/793, 782, 795, 785, 806, 239, 624, 60/39.34, 804, 39.37, 39.42, 39.43, 805, 60/331, 345, 349, 361, 269, 39.22
See application file for complete search history.

(56) References Cited

U.S. PATENT DOCUMENTS

| | | | |
|---|---|---|---|
| 5,520,512 A | | 5/1996 | Walker et al. |
| 5,554,509 A | | 9/1996 | Colucci et al. |
| 5,689,141 A | | 11/1997 | Kikkawa et al. |
| 5,694,026 A | * | 12/1997 | Blanchet ................. F01D 15/10 290/27 |
| 6,519,170 B2 | * | 2/2003 | Lacaze ................... H02M 5/271 363/152 |
| 6,628,005 B2 | | 9/2003 | Nelson et al. |
| 6,979,914 B2 | | 12/2005 | McKelvey et al. |
| 7,317,998 B2 | | 1/2008 | Lacaze et al. |
| 7,321,835 B2 | | 1/2008 | Lacaze et al. |
| 7,466,574 B2 | | 12/2008 | Lacaze |
| 2002/0079706 A1 | | 6/2002 | Rebsdorf et al. |
| 2002/0093840 A1 | | 7/2002 | Lacaze et al. |
| 2003/0137855 A1 | | 7/2003 | Miguchi |
| 2003/0189339 A1 | | 10/2003 | Gupta et al. |
| 2004/0119293 A1 | * | 6/2004 | McKelvey ............... F01D 15/10 290/52 |
| 2004/0222640 A1 | | 11/2004 | McKelvey et al. |
| 2004/0264089 A1 | | 12/2004 | Furuya et al. |
| 2005/0001598 A1 | | 1/2005 | Belokon et al. |
| 2005/0144965 A1 | * | 7/2005 | Ueda ................... F04D 27/0261 62/228.1 |
| 2005/0237774 A1 | | 10/2005 | Lacaze et al. |
| 2006/0101826 A1 | * | 5/2006 | Martis ................... F01D 15/10 60/794 |
| 2006/0272331 A1 | * | 12/2006 | Bucker ................... C01B 3/386 60/774 |
| 2008/0079400 A1 | | 4/2008 | Lacaze |

FOREIGN PATENT DOCUMENTS

| | | |
|---|---|---|
| DE | 3140241 A1 | 4/1983 |
| DE | 4438186 A1 | 5/1996 |
| DE | 10221594 A1 | 11/2003 |
| DE | 10336659 A1 | 6/2004 |
| DE | 102004016453 A1 | 11/2005 |
| DE | 102004016463 A1 | 11/2005 |
| DE | 102004016464 A1 | 11/2005 |
| EP | 0257385 A1 | 3/1988 |
| EP | 0858153 A1 | 8/1998 |
| EP | 1199794 A1 | 4/2002 |
| EP | 1253388 A | 10/2002 |
| GB | 937717 A | 9/1963 |
| JP | 6277098 A | 4/1987 |
| JP | 62077098 | 4/1987 |
| JP | 2001016196 A | 1/2001 |
| JP | 2002165455 A | 6/2002 |
| JP | 2002221647 A | 8/2002 |
| JP | 2002227660 A | 8/2002 |
| JP | 2004215405 A | 7/2004 |
| JP | 2004266961 A | 9/2004 |
| JP | 2006506037 A | 2/2006 |
| JP | 2006238610 A | 9/2006 |
| WO | 2004045058 A1 | 5/2004 |
| WO | 2005047789 A2 | 5/2005 |
| WO | 2005124985 A1 | 12/2005 |
| WO | 2006103159 A1 | 5/2006 |

OTHER PUBLICATIONS

F. Joos et al. "Field Experience With the Sequential Combustion System of the GT24/GT26 Gas Turbine Family" ABB Review No. 5, p. 12-20 (1998)).

The Third Office Action issued on Jul. 16, 2014, by the Chinese Patent Office in corresponding Chinese Patent Application No. 200880012033.0, and an English Translation of the Office Action. (15 pages).

* cited by examiner

POWER STATION AND METHOD FOR ITS OPERATION

CROSS REFERENCE TO RELATED APPLICATIONS

This application is a continuation of International Application No. PCT/EP2008/051596 filed Feb. 11, 2008, which claims priority to Swiss Patent Application Nos. 00245/07 and 00247/07, both filed on Feb. 14, 2007, the entire contents of all of which are incorporated by reference as if fully set forth.

FIELD OF INVENTION

The present invention relates to the field of power station technology. It relates in particular to a power station with electronic decoupling or electronic frequency conversion between the gas turbine and the electrical grid, and to a method for operating same.

BACKGROUND

Large power stations with power range above 100 MW, in which a generator which produces electricity is driven by a gas turbine and/or steam turbine and the electrical power that is produced is fed into an electrical grid at a predetermined grid frequency (for example 50 or 60 Hz), normally have a fixed coupling between the (mechanical) rotation speed of the turbine and the grid frequency. The output of the generator is in this case connected via a grid connection at a locked frequency to the electrical grid, while it is driven either directly (single shaft installation) by the turbine, or with a coupled rotation speed via a mechanical gearbox. Configurations of power stations such as these are shown in a highly simplified form in FIGS. 2 and 3. Only fixed conversion ratios can be achieved between the grid frequency and the turbine by means of a gearbox. However, solutions are also feasible in which the generator is driven by a power turbine which can be driven at a different rotation speed to that of the actual gas turbine.

FIG. 2 shows a highly simplified illustration of a power station 10' of a known type which produces electricity by means of a gas turbine 12 with a coupled generator 18, and feeds this into an electrical grid 21. The gas turbine 12 and the generator 18 are connected by a common shaft 19, and form a single-shaft turbine shafting 11. In the simplest case, the gas turbine comprises a compressor 13 which inducts and compresses combustion air via an air inlet 16. The compressor 13 may be formed from a plurality of partial compressors connected one behind the other, which operate at an increasing pressure level and may possibly allow intermediate cooling of the compressed air. The combustion air which is compressed in the compressor 13 passes into a combustion chamber 15, into which liquid fuel (for example oil) or gaseous fuel (for example natural gas) is injected via a fuel supply 17 and is burned, with combustion air being consumed.

The hot gases which emerge from the combustion chamber 15 are expanded in a downstream turbine 14 with work being carried out, and thus drive the compressor 13 and the coupled generator 18. The exhaust gas, which is still relatively hot when it leaves the turbine, can additionally be passed through a downstream heat recovery steam generator 23 in order to produce steam for operation of a steam turbine 24, in a separate water/steam cycle 25. A combination such as this is referred to as a combination power station. In this case, the steam turbine 24 may be coupled to the generator 18 on the opposite side of the turbine 14. However, it may also drive its own generator.

In the case of the single-shaft installation shown in FIG. 2, the rotation speed of the gas turbine 12 has a fixed ratio with respect to the frequency of the AC voltage as produced in the generator 18, which must be the same as the grid frequency of the electrical grid 21. With the large gas turbine units that are normal nowadays with powers of more than 100 MW, the generator frequency or grid frequency of 60 Hz is associated with a gas-turbine rotation speed of 3600 rpm (for example Model GT24 gas turbine by the assignee of the present application), and the generator frequency of 50 Hz is associated with a rotation speed of 3000 rpm (for example Model GT26 gas turbine also by the Assignee of the present application).

If it is intended to achieve a different ratio between the rotation speed of the gas turbine 12 and the generator or grid frequency, a mechanical gearbox 26 can in principle be inserted between the shaft 19 of the gas turbine 12 and the generator 18 (turbine shafting 11') in a power station 10" as shown in FIG. 3, which mechanical gearbox 26 is normally in the form of a reduction gearbox and therefore allows higher rotation speeds and smaller designs of the gas turbine 12. However, mechanical gearboxes 26 such as these can be used only for power levels below 100 MW, for strength reasons. On the other hand, the large power levels per gas turbine of more than 100 MW and the high efficiencies are achieved in particular with comparatively slowly rotating single-shaft machines.

This then results in the situation shown in FIG. 1. At a rating above 100 MW there are individual single-shaft gas turbines which are designed and optimized for a fixed rotation speed of either 3000 rpm (for 50 Hz; GT26) or 3600 rpm (for 60 Hz; GT24) (F. Joos et al., "Field Experience With the Sequential Combustion System of the GT24/GT26 Gas Turbine Family", ABB Review no. 5, p. 12-20 (1998)). Above 100 Hz and for powers below 100 MW, virtually any desired AC voltage frequencies are possible (shaded area in FIG. 1) by configurations with a power turbine or gearbox, or by multiple shaft gas turbines. In this case, the powers of the gas turbines plotted against the frequency follow a curve A, while the efficiency η follows the curve B. High powers with high efficiencies can therefore be achieved in particular at low rotation speeds, although only singular solutions are available there.

In order to reduce the production costs for singular solutions, U.S. Pat. No. 5,520,512 proposes that at least parts of the turbines be designed to be identical for gas turbine installations for different grid frequencies. However, the rigid coupling between the rotation speed of the gas turbine and the grid frequency remains unchanged in this case.

U.S. Pat. No. 6,628,005 proposes that a single-shaft installation comprising the turbine and generator with the predetermined rotation speed be made usable for different grid frequencies of 50 Hz and 60 Hz by choosing a generator frequency between the two grid frequencies, for example 55 Hz, and by adding or subtracting 5 Hz, by a frequency differentiator, depending on the grid frequency. A rigid coupling is still maintained in this case as well.

The following disadvantages result from the rigid coupling between the turbine rotation speed and the grid frequency for existing installation concepts with existing turbo components:

A stable operation on the electrical grid is possible only to a restricted extent Power level dips occur in the turbine, and excessive thermal and mechanical loads in the case of dynamic control for grid frequency support by raising the gas turbine inlet temperature.

Rapid transients lead to increased loads.

It is impossible to control the power of the power station independently of the grid frequency.

It is impossible to optimize the efficiency of the power station independently of the grid frequency.

It is impossible to optimize partial load of the power station independently of the grid frequency.

Emission control for the gas turbine is possible only to a restricted extent.

The following disadvantages result from the rigid coupling between the turbine rotation speed and the grid frequency for existing installation concepts, with components that need to be newly developed or else new installations:

Compressors and turbines for fixed frequency coupling cannot be designed for an optimum point as will be possible without frequency dependency.

Gas turbines and steam turbines which are designed for fixed 50 Hz or 60 Hz grid frequency coupling are not necessarily cost-optimum for a desired power level since, as a result of the predetermined rotation speed, aerodynamic or mechanical design limits impede optimization, and these limits can be better matched to one another if the rotation speed is variable.

The power level of power station turbines is limited by the predetermined coupling to the grid frequency (see curve A in FIG. 1).

The gas turbines cannot be optimally matched to variable environmental conditions.

U.S. Pat. No. 5,694,026 discloses a single-shaft turbogenerator set without step-down gearbox, in which a static frequency converter is arranged between the output of the generator and the electrical grid, with the aid of which the AC voltage frequency produced by the generator is converted to the grid frequency. When the gas turbine is started, the generator is used as a motor and is supplied with power via the static frequency converter from the electrical grid. The converter contains a direct-current intermediate circuit formed from an inductance.

U.S. Pat. No. 6,979,914 discloses a power station having a single-shaft arrangement comprising a gas turbine and generator, in which a converter is likewise provided between the generator output and the electrical grid, in order to match the AC voltage produced by the generator to the grid frequency. A DC voltage intermediate circuit is in this case arranged in the converter.

A power station having a high-speed-rotating gas turbine (18,000 rpm) and a comparatively low output power (1600 kW) is known from the article by L. J. J. Offringa, et al. "A 1600 kW IGBT Converter With Interphase Transformer for High Speed Gas Turbine Power Plants", Proc. IEEE—IAS Conf. 2000, 4, 8-12 Oct. 2000, Rome, 2000, pages 2243-2248, in which frequency decoupling between the generator and the electrical grid is achieved by a converter with a DC voltage intermediate circuit.

Known power stations with decoupling between the generator output and the electrical grid by a frequency converter with a direct-current or DC voltage intermediate circuit have the disadvantage that the converters result in not inconsiderable power losses which, in the case of power stations with a single-shaft turbine section and powers of more than 100 MW, partially counteract the efficiency improvement achieved in this area, again.

SUMMARY

A first embodiment is directed to a power station, having a turbine shafting. The power station includes a gas turbine and a generator which is driven directly by the gas turbine, that produces alternating current at an operating frequency and whose output is connected to a electrical grid with a given grid frequency. A variable electronic gearbox is arranged between the generator and the electrical grid. The variable electronic gearbox of the gas turbine imposes a rotation speed with a conversion ratio between a mechanical rotation speed and the grid frequency via the generator.

In a further embodiment, the power station includes a gas turbine which is designed for variations of an aerodynamic rotation speed of less than +/−10%, and a generator which is driven directly by the gas turbine, that produces alternating current at an operating frequency and whose output is connected to a electrical grid with a predetermined grid frequency. An electronic decoupling apparatus is arranged between the generator and the electrical grid and decouples the operating frequency from the grid frequency.

In a still further embodiment, a power station having a turbine shafting includes a gas turbine and a generator which is driven directly by the gas turbine that produces alternating current at an operating frequency and whose output is connected to an electrical grid with a predetermined grid frequency. An electronic decoupling apparatus is arranged between the generator and the electrical grid and decouples the operating frequency from the grid frequency. The gas turbine is designed for a power of more than 100 MW, and the electronic decoupling apparatus is a frequency converter in the form of a matrix converter Methods are also disclosed for operating the power stations. The methods include controlling a mechanical or aerodynamic rotation speed of the gas turbine.

BRIEF DESCRIPTION OF THE DRAWINGS

The invention will be explained in more detail in the following text with reference to exemplary embodiments and in conjunction with the drawings, in which.

DETAILED DESCRIPTION OF THE PREFERRED EMBODIMENTS

Introduction to the Embodiments

Figure 1:
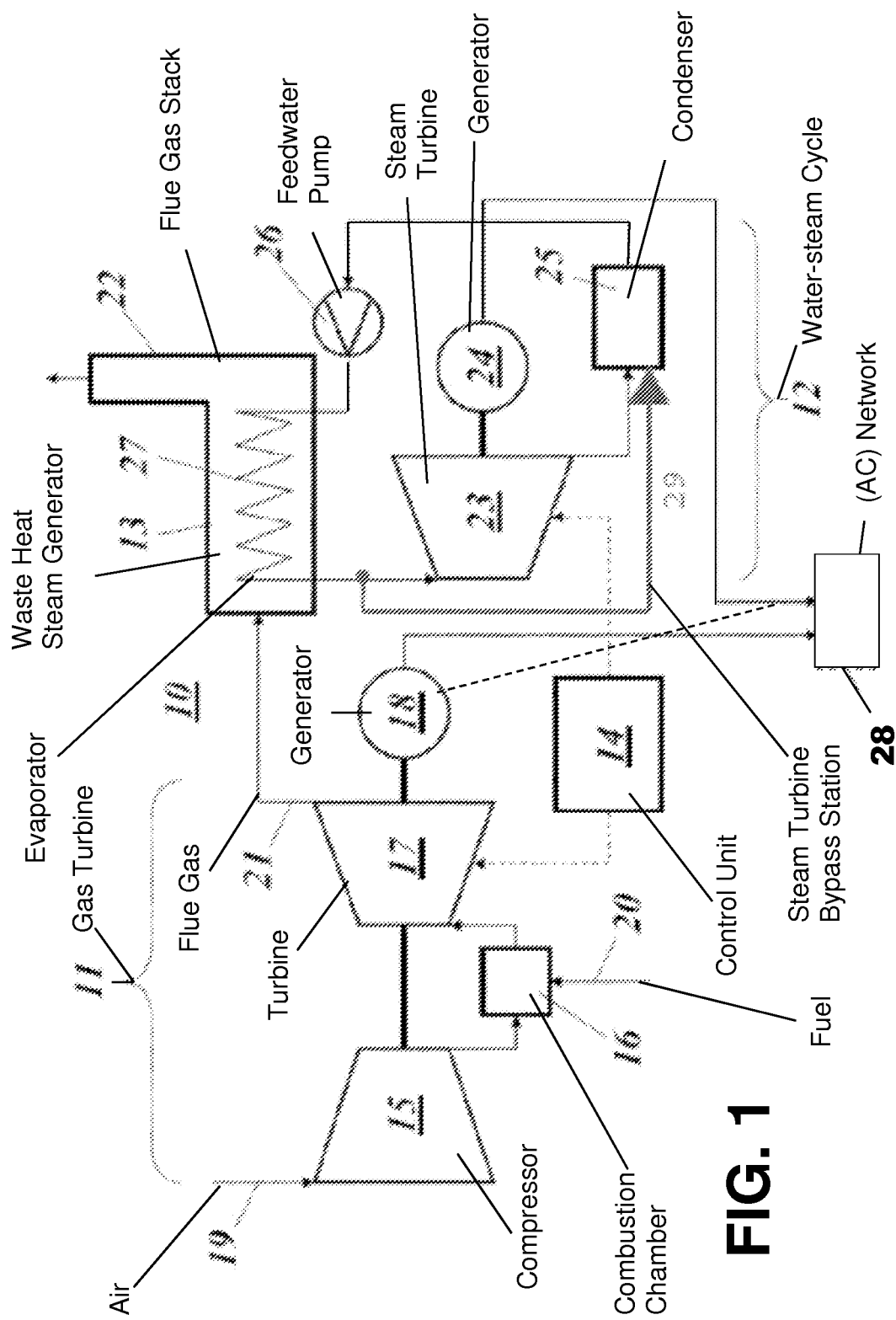
FIG. 1 shows a diagram of the relationship between the possible power (curve A) and the efficiency (curve B) of a gas turbine installation and the operating frequency.

One object of the disclosure is to provide a power station which avoids the disadvantages of known power stations flexible operation with high efficiency at the same time, and to specify a method for its operation.

The fundamental idea is to isolate the frequency of a gas-turbine generator set from the electrical grid by an electronic apparatus. By way of example, this apparatus is a matrix converter. This allows the design and operation of the gas turbine to be adjusted and controlled optimally for different constraints without significantly reducing high efficiency.

According to one refinement of the disclosure, the operating frequency differs considerably from the grid frequency, in particular with the operating frequency being lower than the grid frequency, and the grid frequency being 50 Hz or 60 Hz. In one preferred embodiment, the grid frequency is 60 Hz and the operating frequency is 50 Hz.

However, the operating frequency can also be higher than the grid frequency, which is preferably 50 Hz or 60 Hz. In particular, the grid frequency can be 50 Hz and the operating frequency 60 Hz.

Another refinement of the disclosure is that the matrix converter comprises a plurality of controllable bidirectional switches which are arranged in an (m×n) matrix and, controlled by a controller, connect m inputs selectively to n outputs, where m is greater than n, and where a first device is provided for determining the polarity of the currents in the inputs, and a second device is provided for determining the polarity of the voltages between the inputs, and where the first and second devices are operatively connected to the controller. Bidirectional switches may comprise one component or also may be formed from a plurality of components. For example, two back-to-back parallel-connected thyristors with opposite forward-biased directions can be used as controllable bidirectional switches. The device for determining the polarity of currents and voltage may, for example, be ammeters or voltmeters. Alternatively, it is also possible to use binary sensors, for example, which emit only the polarity.

According to a further refinement of the disclosure, the electronic decoupling apparatus is used as a variable electronic gearbox. This makes it possible to reliably control the rotation speed of a gas turbine which is connected to the electrical grid. This variable electronic gearbox can be provided, for example, by a matrix converter.

The rotation speed is controlled in that the target rotation speed is transferred to the variable electronic gearbox, and the rotation speed is imposed on the gas turbine via the generator. In this case, the generator is supported via the variable electronic gearbox with respect to the electrical grid, which is effectively static in comparison to the gas turbine, and imposes the target rotation speed by the control of the frequency ratio between the mechanical rotation speed and the grid frequency of the gas turbine.

According to one refinement of the disclosure, the conversion ratio from the gas turbine rotation speed to the grid frequency of the variable electronic gearbox is less than unity. In particular, for example, it is five-sixths.

The conversion ratio from the gas turbine rotation speed to the grid frequency of the variable electronic gearbox is, however, also greater than unity. In particular, for example, it is six-fifths.

A further refinement allows flexible rotation speed control around a designed conversion ratio.

The target rotation speed is governed by the design and the operating conditions of the gas turbine. By way of example, this can be done in the gas turbine control system, from which the target rotation speed is transmitted to the controller for the variable gearbox. It is also feasible for the target rotation speed to be determined in a separate controller or a superordinate unit controller, which coordinates the control of gas turbine and steam turbine in a combination power station.

A further refinement of the disclosure is distinguished by a gas turbine whose design is optimized for operation in a power station with electronic decoupling from the electrical grid.

A further refinement with particularly high efficiency and low emission values is distinguished in that the gas turbine is a gas turbine with sequential combustion.

DETAILED DESCRIPTION

Figure 2:
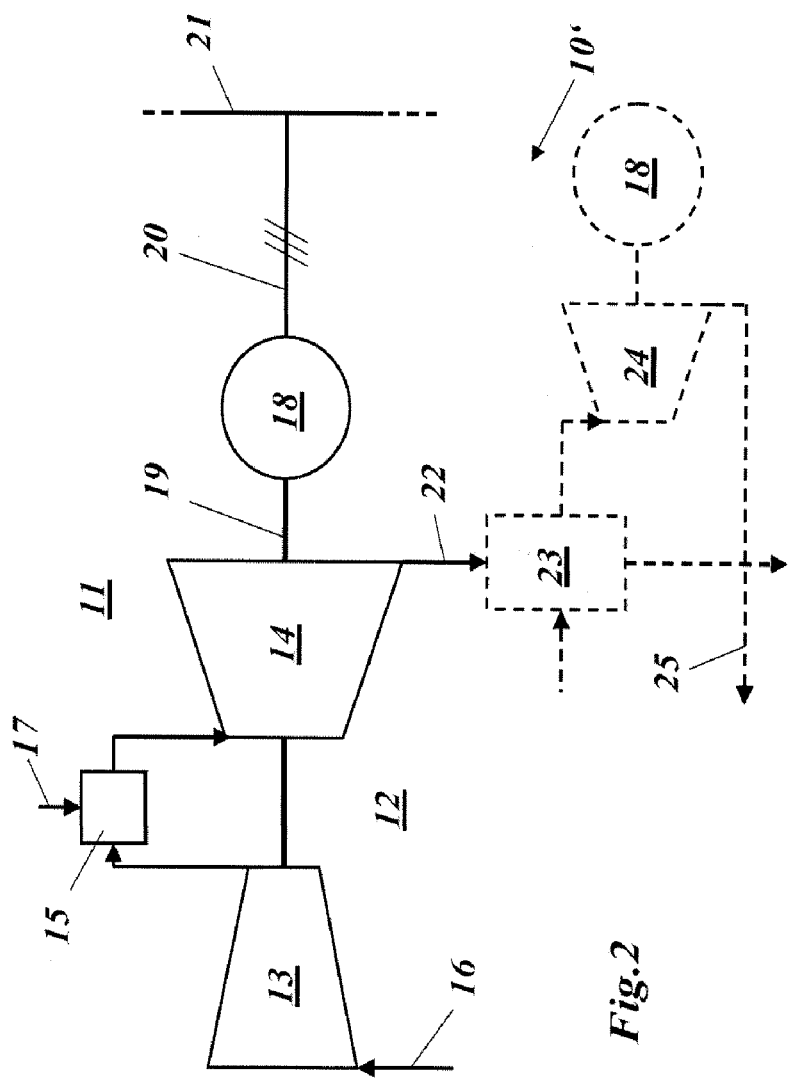
FIG. 2 shows a highly simplified schematic diagram of a power station having a gas turbine and a single-shaft turbine shafting according to the prior art.
Figure 3:
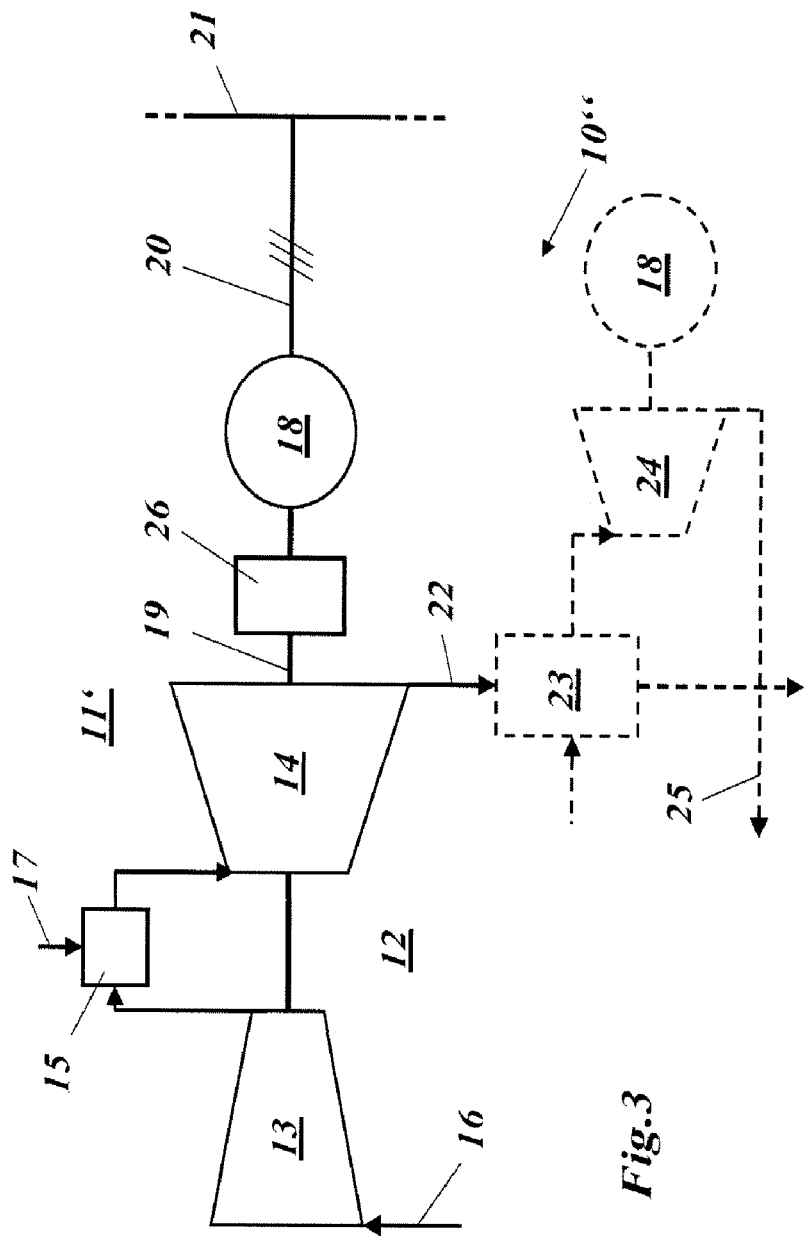
FIG. 3 shows a highly simplified schematic diagram of a power station having a gas turbine and a mechanical gearbox according to the prior art.
Figure 4:
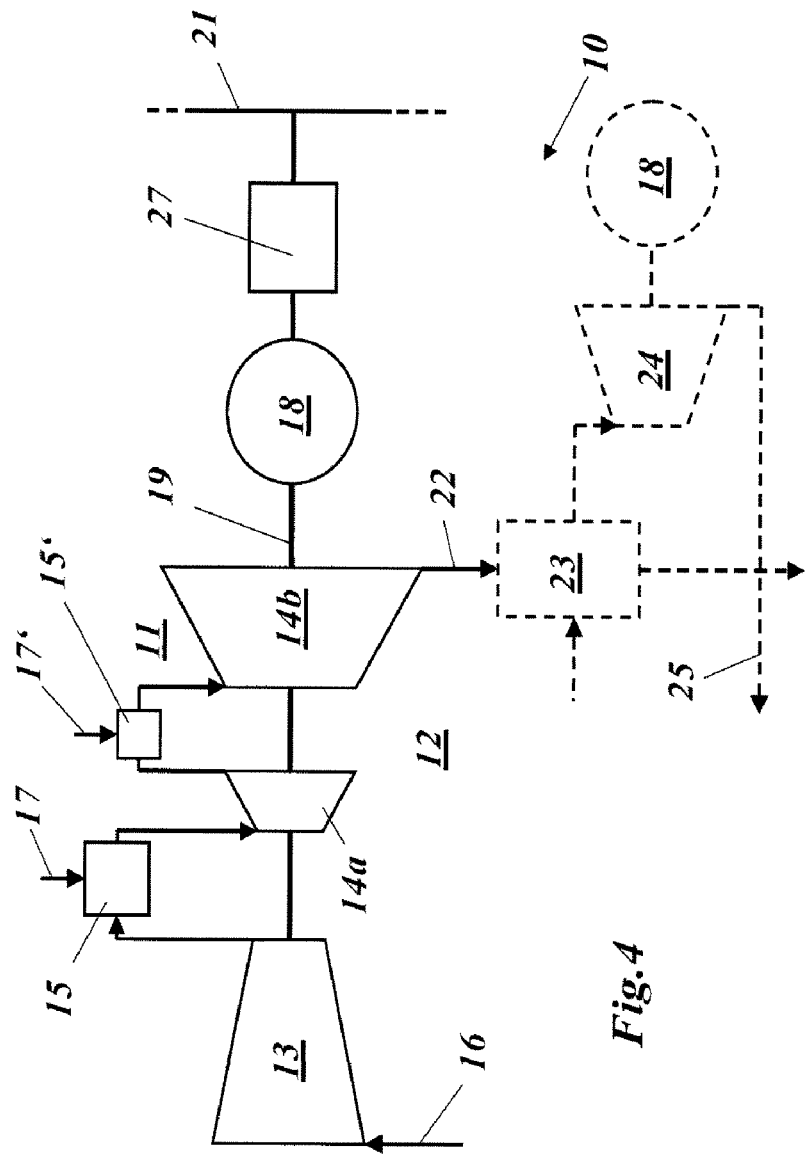
FIG. 4 shows a highly simplified schematic diagram of a power station having a gas turbine and as electronic decoupling apparatus, according to one exemplary embodiment of the disclosure.
Figure 5:
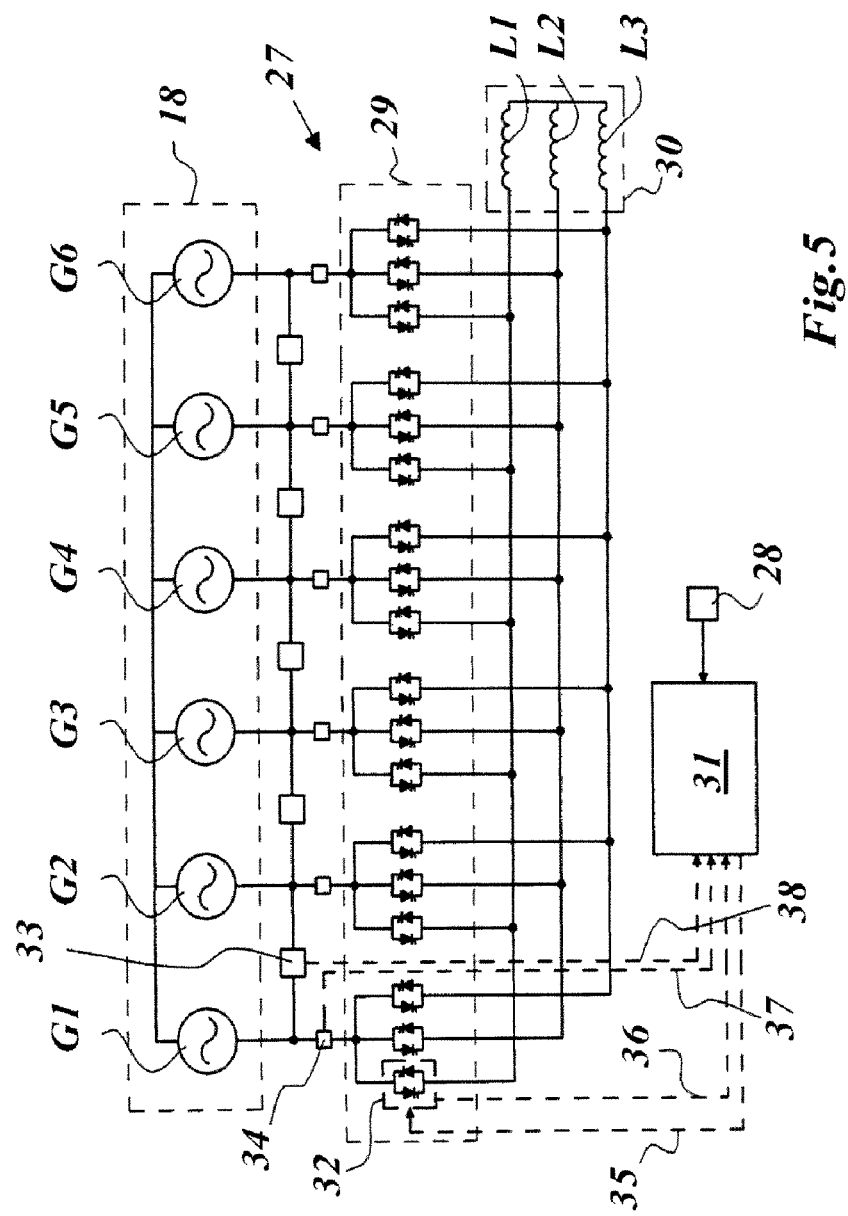
FIG. 5 shows an example of the internal design of a matrix converter, as may be used an electronic decoupling apparatus in an installation as shown in FIG. 4.

FIG. 4 shows a highly simplified schematic diagram of a power station having a gas turbine and an electronic decoupling apparatus according to one exemplary embodiment. The power station 10 comprises a gas turbine 12 with a compressor 13 and sequential combustion, in which a first combustion chamber 15 produces hot gas by a first fuel via a first fuel supply 17, which hot gas is expanded in a first turbine 14a and is then passed into a second combustion chamber 15' where, by a second fuel via a second fuel supply 17', the temperature of the hot gas is increased for a second time, and this hot gas is then expanded in the second turbine 14b. Instead of the sequential combustion, which is particularly advantageous with regard to the efficiency, it is, however, also possible to provide single-stage combustion. The other parts of the installation correspond to the parts with the same reference symbols in FIG. 2 or 3.

The generator 18 is directly coupled to the shaft 19 of the gas turbine 12. The generator 18 therefore rotates at the same rotation speed as the gas turbine 12. However, an electronic decoupling apparatus or a variable electronic gearbox 27 is now arranged between the output of the generator 18 and the electrical grid 21, resulting in the operating frequency produced in the generator 18, or the rotation speed of the gas turbine 12, being decoupled from the predetermined grid frequency of the electrical grid, thus allowing the mechanical rotation speed $n_{mech}$ of the gas turbine 12 to be controlled.

The electronic decoupling apparatus or the variable electronic gearbox 27 is preferably a matrix converter, without a direct-current intermediate circuit, in order to limit the power loss. A matrix converter such as this which, by virtue of its drive, operates with particularly low losses, has been described, in terms of its design and method of operation, in EP-A2-1 199 794. Further embodiments of a matrix converter such as this have been disclosed in EP-A1-1 561 273, DE-A1-10 2004 016 453, DE-A1-10 2004 016 463 and DE-A1-10 2004 016 464. FIG. 4 shows the outline schematic diagram of a matrix converter with six input phases and three output phases. The matrix converter (27) sequentially connects 6 phases G1, . . . , G6 of a generator 18 as a source to 3 phases L1, ..., L3 of a load 30. The power section 29 which is required for this purpose comprises 18 bidirectional switches 32 in the form of back-to-back parallel-connected thyristors (in the general case there are m×n switches for m input/source phases and n output/load phases). The switches 32 are arranged in a (6×3) matrix. A regulator or a controller 31 is provided for driving the switches 32, and receives time signals (a clock frequency) from a timer 28. The switching state of the switches 32 (ON, OFF) is monitored, and is in each case signaled to the controller 31 via a first signal line 36. The switches 32 are each driven by the controller 31 via a control line 35.

A current measurement device 34 is arranged in each of the individual phases G1, ..., G6 of the generator 18 and signals the polarity of the phase current to the controller 31 via a second signal line 37. Furthermore, voltage measurement devices 33 are arranged between the phases G1, ..., G6 of the generator 18 and signal the polarity of the respective phase difference voltage via a third signal line 38 to the controller 31. With regard to the details of the operating procedure of the matrix converter, reference is made to the abovementioned documents.

As an alternative to the pure frequency decoupling between the output of the generator 18 and the electrical grid 21, the decoupling apparatus 27 may be in the form of a variable electronic gearbox 27, which imposes an operating frequency or rotation speed $n_{mech}$ on the gas turbine controlled via the generator 18, with this operating frequency or rotation speed $n_{mech}$ being independent of the grid frequency F. The conversion ratio X of the variable electronic gearbox 27 is governed by the target rotation speed 51 and the actual grid frequency F.

The variable electronic gearbox or the decoupling apparatus 27, in particular in the form of a matrix converter of the described type, results in the following advantages:

- In the case of rigid frequency coupling, the gas turbine can be operated with frequency discrepancies of only up to 5-6% of the grid frequency. This restriction is avoided in practice.
- The grid frequency of the electrical grid 21 can be supported over a wide grid frequency range. While frequency support can be achieved in the range of 5-6% of the electrical grid frequency with rigid frequency coupling, the electronic decoupling or control of the frequency ratio of the electronic variable gearbox makes it possible to achieve support over the range of considerably more than 10%.
- The operating optima (power, efficiency) can be adapted as a function of the environmental conditions (for example the inlet temperature).
- The power can be increased.
- The efficiency can be improved.
- The flexibility in the event of load fluctuations and the life of the turbine can be improved. The turbine can continue to run at a constant rotation speed. Previously occurring additional thermal or mechanical loads which were necessary as a result of measures for rotation speed support are avoided or are reduced.
- The emission values can be improved. The additional degree of freedom of a variable rotation speed allows a desired power to be achieved at a higher or lower rotation speed. When a gas turbine is used as the drive, this is associated with lower or higher turbine inlet temperatures, with the effect of influencing the $CO_2$ and $NO_x$ emissions. In particular, increased emissions in the case of frequency support can be avoided.

Frequency decoupling or variable frequency ratios make it possible to design power stations in which the physical size for a desired power level can be minimized, to be precise by the additional degree of freedom, since the rotation speed can be adjusted independently of the grid frequency. (For example a turbine for 3300 rpm is considerably smaller than a turbine for 3000 rpm). This also makes it possible to reduce the construction costs.

Frequency decoupling or variable frequency ratios make it possible to construct power stations in power ranges which to date it has not been possible to achieve with comparable drive technology (for example in the case of a 2400 rpm turbine, it is possible to increase the power by about 60% in comparison to an existing 3000 rpm turbine).

The operation of a gas turbine independently of the grid frequency and operating frequency of the load makes it possible to optimize the design further since considerable margins for off-design operation are required in conventional gas turbine designs. The main advantages are:

- A reduced mechanical rotation speed $n_{mech}$ at low ambient temperatures $T_{amb}$ results in a low compressor outlet pressure at optimum component efficiency and no shift in the pressure profile (pressure ratios) in the compressor and turbine:
  - The housing design, the cooling air cooler and the external lines are optimized with reduced margins for extreme $T_{amb}$.
  - The maximum fuel pressure is reduced. The design margin for the fuel distribution system FDS is correspondingly reduced, as are the requirements for a compressor for gaseous fuel.
- A constant reduced rotation speed results in identical velocity triangles at the compressor and turbine outlet (for a basic load). This results in diffusers which are better optimized to the design.
- There is no shift in the pressure buildup in the compressor. The pressure ratios for the cooling air supply are no longer dependent on the ambient temperature $T_{amb}$ (or are dependent on it only to a lesser extent). There is no need to incorporate any margin in the cooling air pressure ratios for variations in the $T_{amb}$ in the cooling air system. It is correspondingly possible to optimize the design condition so as to achieve better efficiency and a higher gas turbine power:
  - This additionally improves the correction curve for $T_{amb}$ in particular for high $T_{amb}$ there is no requirement to consume an unnecessarily large amount of cooling air.
- This results in smaller variation in the axial thrust over $T_{amb}$. A smaller axial bearing is sufficient. This leads to cost savings and, furthermore, to reduced power losses in the bearing (smaller lubricating oil system). This also results in an improvement in power and efficiency.

Figure 7:
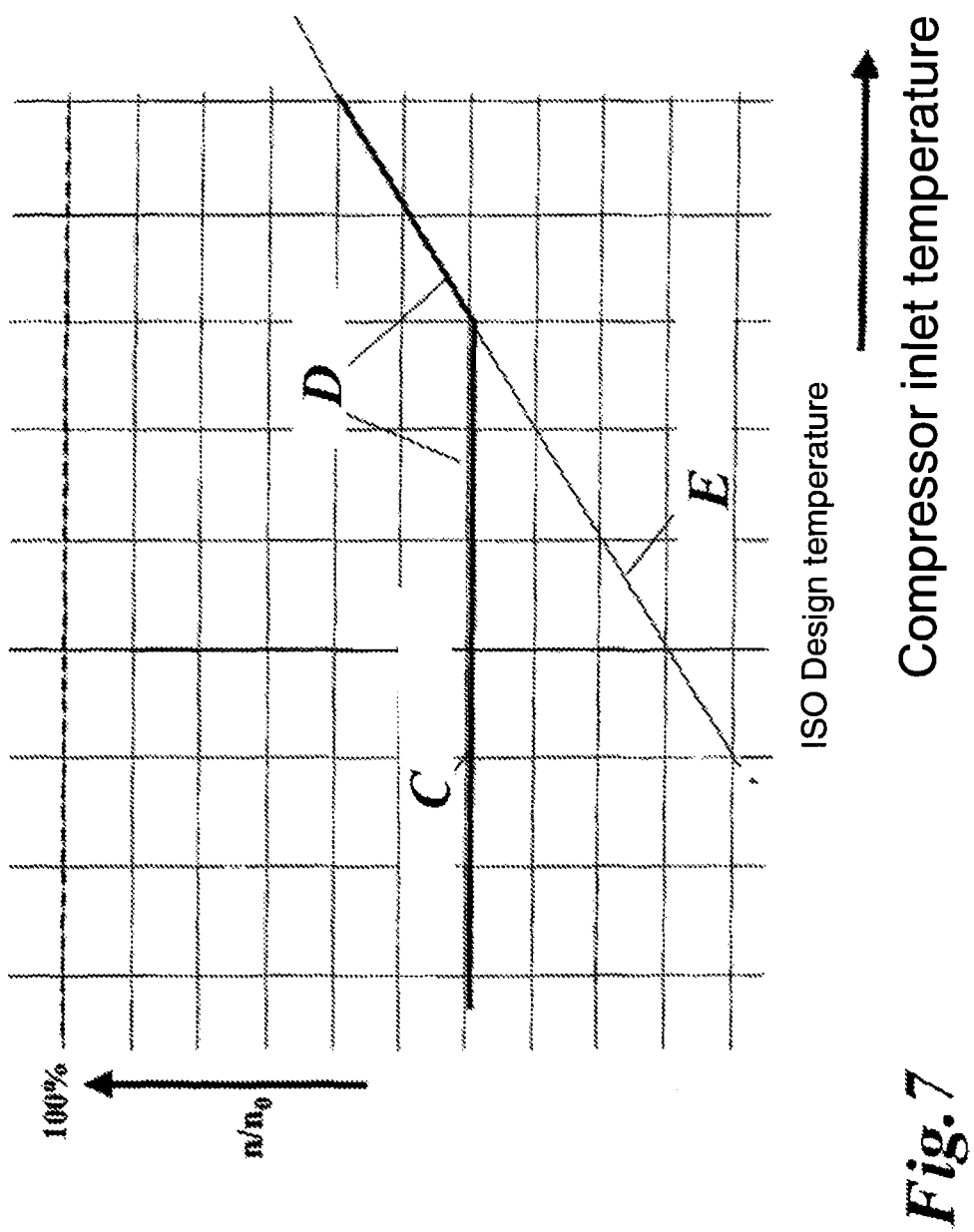
FIG. 7 shows the relationship between a lower rotation speed limit and the compressor inlet temperature.

The primary capability, according to the disclosure of being able to operate a turbine shafting—turbine and generator—within a power station in a stable manner at a desired rotation speed independently of the grid frequency, assists the stabilization of electrical grids. In the event of frequency dips, the power station must be able to maintain the power delivered at the normal grid frequency. Ideally, an actually increased power level should be delivered to the electrical grid. Previous power station systems can ensure this only to a restricted extent. The grid frequency reduction is sensed by a system that is rigidly coupled to the grid frequency as an undesirable reduction in rotation speed at the turbine and the generator. After a short phase during which kinetic energy is fed into the grid from the gas turbine/generator/shaft section as a result of deceleration in rotation speed, the delivered power falls. In this case, a gas turbine system reacts with a reduced induction mass flow and a considerably increased fuel supply, thus leading to a raised hot-gas temperature within the turbine. This in turn considerably reduces the life of the turbine, thus increasing the operating costs of the installation. The hazardous emissions in the form of $NO_x$ are likewise considerably increased in this operating phase. Two limits have therefore already been defined which greatly restrict a power increase in the event of a grid frequency drop—life and emissions. The mechanical and aerodynamic compatibility plays a role as the third aspect. Major frequency drops of more than 6% lead to power stations being shut down since they are mechanically unable to operate at correspondingly reduced rotation speeds. At a low aerodynamic rotation speed of $$n^* = n_{mech} \frac{p}{\sqrt{kT}},$$

operation is furthermore restricted by the surge limit of the compressor (see FIG. 7; C=mechanical rotation speed limit, D=load shedding and E=compressor surge protection).

In the case of a system which is decoupled from the grid frequency, or of a system with a controllable frequency ratio, all the disadvantages described above are avoided. There is no restriction to the minimum permissible grid frequencies, since the turbine shafting need not follow the grid frequency. In consequence, there are also no increases in hazardous emissions or reductions in life.

In addition to grid stabilization, a power station system such as this also allows power or efficiency optimization at every operating point, in particular including partial load operating points. Suitable rotation speed control as a function of the operating point, within the permissible mechanical limits, results either in an emission saving and fuel saving as a result of the increase in the turbine efficiency or alternatively a power increase, which increases the flexibility of a power station for covering peak loads.

A further positive aspect of a power station system which is independent of the grid frequency is the better matching capability of an installation to different location conditions. The already mentioned grid stability is one major aspect which is critically dependent on the location. In addition, in particular, there are different environmental conditions, such as external temperatures, air pressure, in particular air pressure resulting from the installation altitude, air humidity, and fuel composition, which influence the operating state of a power station. The additional degree of freedom of independent rotation speed control in each case allows optimized operating conditions to be produced, as appropriate for the instantaneous environmental conditions. Efficiency improvements or power increases are possible in this case.

For example, in a simple form, the mechanical rotation speed can be controlled in inverse proportion to the compressor inlet temperature in order to keep the aerodynamic rotation speed of the gas turbine 12 constant. If the relationship between the aerodynamic rotation speed and the compressor inlet pressure is not taken into account in the control process, then a discrepancy between the mean ambient pressure, which depends on the location of the power station, and the design pressure of the gas turbine can be taken into account by correction of a mechanical reference rotation speed. On the basis of this corrected reference rotation speed, the target rotation speed of the gas turbine 12 is controlled in proportion to the square root of the compressor inlet temperature $T_{K1}$.

Even if the pressure is taken into account in the calculation of the aerodynamic rotation speed, it may be advantageous to correct the reference rotation speed. When the power station is installed at a high altitude, with correspondingly low ambient pressure, unless a correction process is carried out, the control system 39 will always calculate the maximum permissible mechanical rotation speed as the target rotation speed 51. This will result in most of the advantages which are obtained by decoupling of the grid frequency or variable control of the frequency ratio to be lost again. Correspondingly, it is advantageous to choose a reference rotation speed which still allows flexible operation.

Furthermore, by way of example, it may be advantageous to correct the reference rotation speed as a function of the fuel gas that is used. On the basis of a gas turbine design, for example for ISO methane, the fuel gas volume flow will increase as the specific calorific value of the fuel gas decreases, and the combustion chamber pressure and compressor outlet pressure will therefore rise. It is proposed that this be compensated for by reducing the reference rotation speed in inverse proportion to the calorific value of the fuel gas. This is relevant, for example, for combustion of synthetic gases.

The efficiency improvement potential of this new technology with respect to an electricity production location may be in the order of magnitude of 3% (multiplicatively) for the turbine in a typical application. Power increases of considerably more than 10% with respect to an electricity production location are feasible. Grid frequency restrictions are negligible.

All of the aspects mentioned above can already be implemented for existing turbines. Furthermore, various options to allow gas turbines to be optimized are opened up, when the rotation speed of the gas turbine is not limited by the grid frequency.

Turbo components, compressors and turbines can be designed based on new constraints. Hitherto, even in the case of stationary gas turbines, it has been necessary to take into account a minimum operating range of about +/−10% reduced rotation speed as a safety window. This ensures that the gas turbine can, on the one hand, withstand mechanical rotation speed fluctuations which are caused by grid frequency fluctuations. On the other hand, changes in the inlet temperature, which are included in the reduced rotation speed in the ratio $1/(T_{inlet})^{1/2}$, can be covered. If the required reduced rotation speed range is reduced by an optimized operating concept, both an efficiency improvement and a power gain can be achieved by redesign of the compressor and turbine blades.

A further alternative way to exploit flexibility with regard to the grid frequency is the capability to develop turbines and generators in rotation speed ranges which have not been feasible until now. Larger power station units can thus be produced by reducing the rotation speed in comparison to the grid frequency, for example to 45 Hz.

In the rotation speed range where turbines can no longer be equipped with gearboxes but which is still above the grid frequency, it is possible to construct more compact and therefore more cost-effective gas turbines, provided that the power is below the power limit for the given grid frequency.

The generator likewise has the advantage that it can be designed to be more compact, because the rotation speed is higher.

As a final option in the field of modern turbines with gearboxes, it is possible to dispense with the gearbox and to design the generator for the turbine rotation speed. In this case as well, the generator is smaller and more cost-effective.

Figure 6:
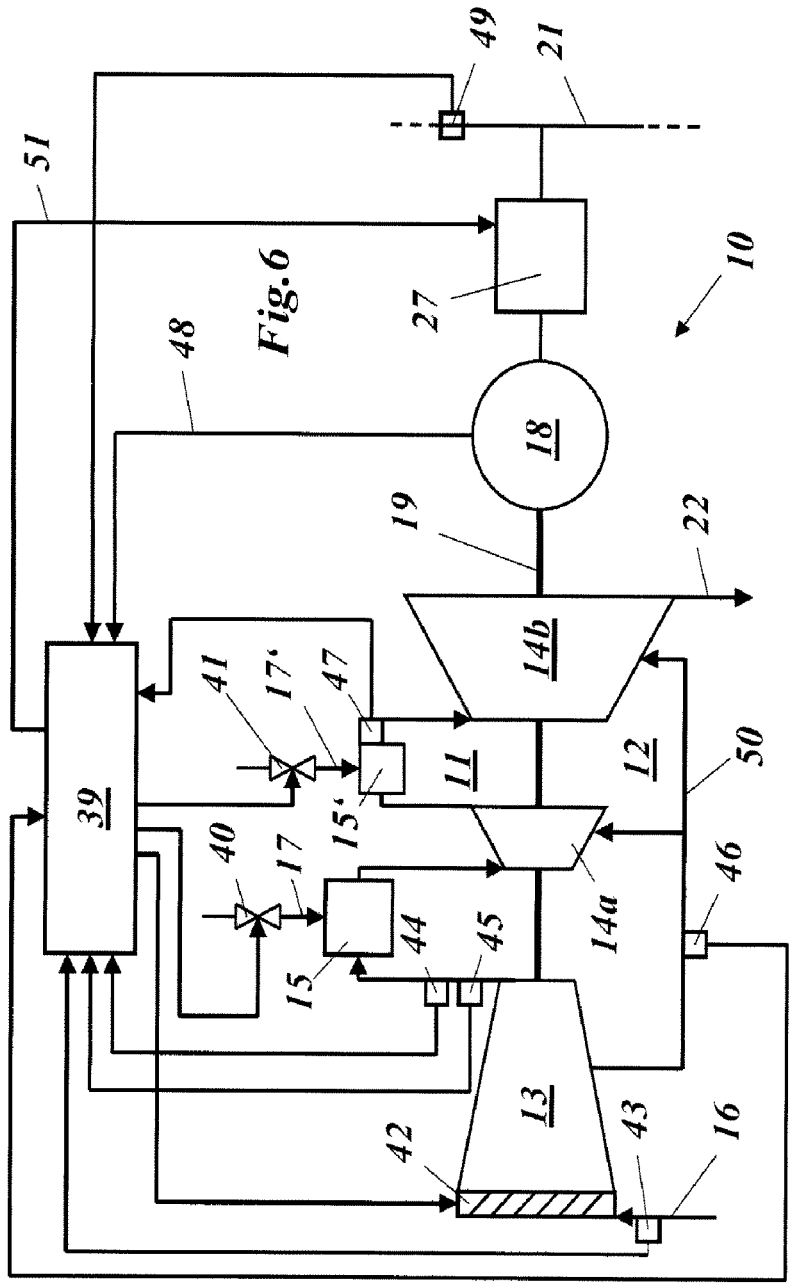
FIG. 6 shows an installation comparable to that in FIG. 4, with different options for control according to the disclosure.

FIG. 6 shows a simplified diagram of a power station 10 which is designed for an operating method according to the disclosure. The turbine shafting 11 with the gas turbine 12 and the generator 18 correspond to that in FIG. 4. This also applies to the variable electronic gearbox or to the electronic decoupling apparatus 27 and the connected electrical grid 21. The electrical grid 21 may be a general supply grid, or else a railway electrical grid. Instead of the electrical grid 21, a load, for example an industrial drive or a compressor for a natural-gas liquefaction installation, may also be connected. A possible additional steam turbine with a corresponding water/steam cycle is not illustrated here, for space reasons.

Open-loop or closed-loop control is provided for the gas turbine 12 by at least one row of adjustable compressor guide vanes 42 at the inlet of the compressor 13 and control valves 40 and 41 in the respective fuel supply 17 or 17' to the combustion chambers 15, 15'. The corresponding control signals come from an open-loop or closed-loop control system 39 based on specific input parameters, which can be used individually or in a selectable combination. One possible parameter is the compressor inlet temperature, which is measured by a first transducer 43 arranged at the air inlet 16. Other possible parameters are the compressor outlet temperature and the compressor outlet pressure, which are measured by a second and third transducer 44 and 45, respectively, at the compressor outlet. A further transducer 46, which is arranged on a cooling air supply 50 from the compressor 13 to thermally loaded components in the gas turbine 12, for example in the two turbines 14a and 14b, measures the pressure and/or the temperature and/or the flow rate of the cooling air. A further transducer 47 can be arranged on the second combustion chamber 15', in order to measure the pressure in this combustion chamber. By way of example, the rotation speed of the gas turbine 12 can be tapped off at the generator 18 and can be introduced into the closed-loop control system 39 via a measurement line 48. A grid frequency sensor 49 can be provided in order to measure the grid frequency in the electrical grid 21. Finally, a value for an intended power ZL can be introduced into the closed-loop control system 39.

The closed-loop control system 39 controls the aerodynamic or mechanical rotation speed $n_{mech}$ of the gas turbine 12 and of the generator, when electronically decoupled from the electrical grid, on the basis of one or more of these parameters, without the rotation speed being influenced in any other manner by the grid frequency F of the electrical grid 21.

Alternatively, for example, the rotation speed can also be controlled by transferring the target rotation speed 51, as calculated in the closed-loop control system 39 for the gas turbine, to the controller 31 for the variable electronic gearbox 27, and by imposing the target rotation speed 51 on the gas turbine 12 via the generator. The generator 18 is in this case supported via the variable electronic gearbox 27 with respect to the electrical grid 21, which is quasi-static in comparison to the gas turbine 12, and imposes the target rotation speed 51 by controlling the frequency ratio between the e grid F and the mechanical rotation speed $n_{mech}$ of the gas turbine. In this context, a quasi-static electrical grid 21 means that changes in the grid frequency F resulting from changes in the rotation speed $n_{mech}$ or the power delivered from the relevant gas turbine 12 to the electrical grid 21 are very small, and are negligible or can easily be compensated for in the closed-loop control process. In particular, this means that, when the imposed gas turbine rotation speed is adapted, any possible resultant change in the grid frequency F is reduced by one order of magnitude. In general, the resultant change in the grid frequency F cannot be measured in the grid's noise.

FIG. 7 shows, in a simplified form, the normalized minimum rotation speed, which should be considered conventional, of a gas turbine 12 plotted against the compressor inlet temperature $T_{k1}$, with respect to which the gas turbine 12 is protected against undershooting by load shedding D. This comprises a mechanical rotation speed limit C and compressor surge protection E.

A further improvement in the flexibility and the operating region of a gas turbine can be achieved within the scope of the invention in that the absolute rotation speed range in which the gas turbine 12 can be operated in the steady state on the electrical grid 21 can be extended considerably to low rotation speeds $n_{mech}$.

For steady-state operation with conventional gas turbines 12, the minimum mechanical rotation speed $n_{mech}$ is restricted by the excitation of natural frequencies. By way of example, these may be blade natural frequencies. Rotation speed ranges in which natural frequencies are excited can only be passed through in a transient form. This is done during acceleration or deceleration of the gas turbine 12, as long as this gas turbine 12 is not synchronized to the electrical grid 21. A blocking range in which the gas turbine 12 cannot be operated in the steady state is located around rotation speeds $n_{mech}$ which can lead to excitation of natural frequencies. The uppermost blocking range below the operating frequency of the gas turbine 12 conventionally justifies the mechanical rotation speed limit C. The proposed control of the gas turbine rotation speed separately from the grid frequency, makes it possible to pass in a transient form through the blocking ranges even while power is being delivered from the gas turbine to the electrical grid, and to operate the gas turbine at a rotation speed $n_{mech}$ below a blocking range. During operation with an electronic decoupling apparatus, or a variable electronic gearbox 27, it must be remembered that the electronic apparatus can exert excitations on the shaft section via the generator 18 at specific frequencies. If these lead to critical natural oscillations in the shaft 19, blades or other components of the shaft section, these frequencies must also be avoided. The blocking ranges can also be included in the closed-loop control system for the gas turbine 39. Since these excitations depend on the electronic apparatus, the blocking ranges are, in one embodiment, stored in the controller 31 for the variable electronic gearbox 27. If the target rotation speed 51 falls into a blocking range such as this, this is corrected in the controller 31 to the next higher or next lower value below or above the blocking range, and the variable electronic gearbox is controlled in accordance with the corrected value.

Figure 8:
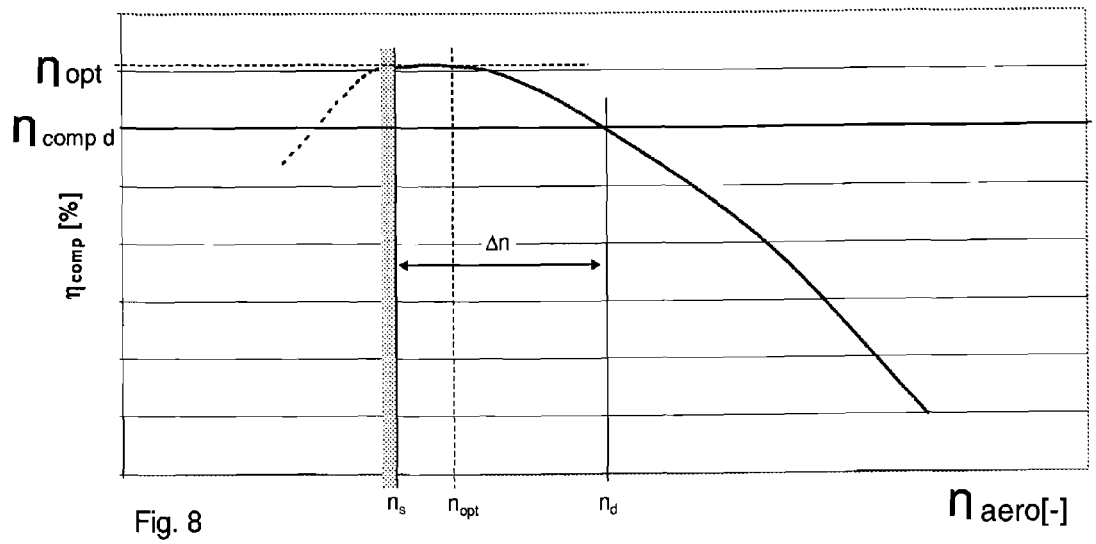
FIG. 8 shows the compressor efficiency as a function of the aerodynamic rotation speed.

The rotation speed limits to be observed, such as those which are illustrated in a simplified form in FIG. 7 using the example of load shedding as compressor surge protection E at a reduced rotation speed, are a compromise between two contradictory requirements: on the one hand, the operating range of the gas turbine 12 should be restricted as little as possible, while on the other hand the compressor should be operated as closely as possible to the surge limit, because this is where the highest efficiency is achieved. The influence of the margin $\Delta n$ from the surge limit $n_s$ on the compressor efficiency $\eta_{comp}$ achieved during operation is illustrated schematically in FIG. 8. The highest compressor efficiency $\eta_{opt}$ is achieved at an optimum aerodynamic rotation speed $n_{opt}$ slightly above the surge limit $n_s$. A conventional gas turbine 12 is not operated at design conditions at this rotation speed since the margin $\Delta n_{mech}$ to the surge limit $n_s$ must be complied with. This leads to a lower compressor design efficiency $\eta_{comp\ d}$ at the design rotation speed $n_d$.

When carrying out a redesign for a gas turbine 12 with a controllable rotation speed, the compressor can be optimized with smaller margins $\Delta n$ to the surge limit $n_s$, and can be designed for operation closer to or at the optimum rotation speed $n_{opt}$, since changes in the aerodynamic rotation speed resulting from changes in the compressor inlet temperature can be compensated for by controlling the mechanical rotation speed $n_{mech}$. In addition, the margin for changes in the grid frequency F can be reduced, or can be completely omitted. This improves the efficiency of the compressor 13 and, finally, of the entire power station.

Figure 9:
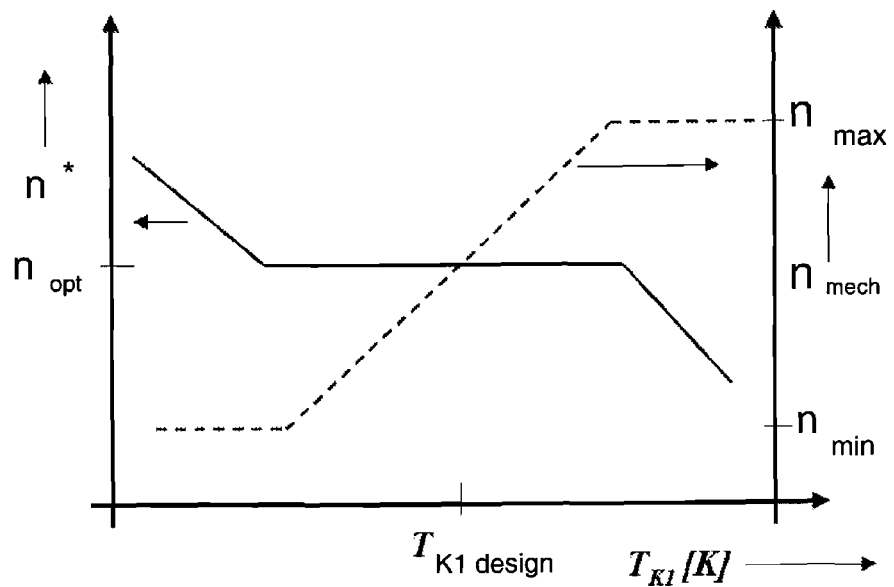
FIG. 9 shows the control of the aerodynamic rotation speed n* and of the mechanical rotation speed $n_{mech}$ plotted against the compressor inlet temperature $T_{K1}$.

A closed-loop control system 39 in which the mechanical rotation speed $n_{mech}$ is controlled as a function of the compressor inlet temperature $T_{K1}$ is shown in FIG. 9. The mechanical rotation speed $n_{mech}$ is raised in proportion to the compressor inlet temperature $T_{K1}$, in order to keep the aerodynamic rotation speed.

$$n^* = n_{mech} \frac{p}{\sqrt{T_{k1}}},$$

constant. It is also feasible to control the mechanical rotation speed $n_{mech}$ at a constant value, or to readjust it to a constant value, as soon as mechanical or other limit values are reached, for example pressures or temperatures. Specifically, on the basis of the design temperature $T_{K1d}$, at which the optimum aerodynamic rotation speed $n_{opt}$ is reached with a mechanical rotation speed $n_{mech}$, the mechanical rotation speed $n_{mech}$ is raised as the compressor inlet temperature $T_{K1}$ increases, until the upper limit is reached at the mechanical rotation speed $n_{max}$. Analogously, when the compressor inlet temperature $T_{K1}$ falls, the mechanical rotation speed $n_{mech}$ is reduced until the lower limit is reached at the mechanical rotation speed $n_{min}$. In this example, the mechanical rotation speed $n_{mech}$ is kept constant after reaching the mechanical limits.

Figure 10:
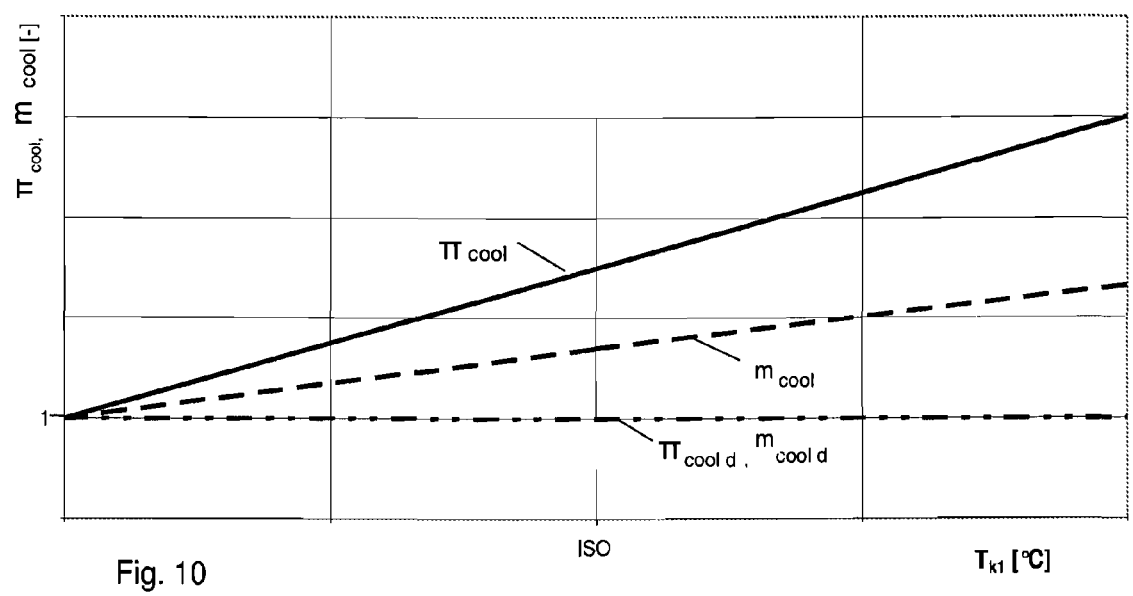
FIG. 10 shows the profile of the normalized cooling air pressure ratio $\pi_{cool}$ and of the normalized cooling air mass flow $m_{cool}$ plotted against the compressor inlet temperature $T_{K1}$ for a cooling air system for the gas turbine.

FIG. 10 shows, schematically, as an example the profile of the normalized cooling air pressure ratio $\pi_{cool}$ and of the normalized cooling air mass flow $m_{cool}$ plotted against the compressor inlet temperature $T_{k1}$ for a cooling air system for the gas turbine 12, which is supplied with cooling air 50 from the center part of the compressor. In contrast to cooling air which is bled off from the compressor end and is necessarily always available at the compressor outlet pressure, when cooling air is bled from the compressor a constant pressure ratio is not ensured for all operating states since the pressure buildup in the compressor changes depending on the operating conditions. This is taken into account in the design of the cooling air system in such a way that the minimum required amount of cooling air $m_{cool\ d}$ with the minimum required cooling air pressure ratios $\pi_{cool}$ is available through the entire design range.

In conventional gas turbines, the normalized cooling air pressure ratio $\pi_{cool}$ and the normalized cooling air mass flow $m_{cool}$ rise with the compressor inlet temperature $T_{k1}$. Even in ISO conditions, this leads to an increased cooling air consumption $m_{cool}$ which rises further with the compressor inlet temperature and leads to loss of power and efficiency. When the mechanical rotation speed $n_{mech}$ is increased, the normalized cooling air pressure ratio $\pi_{cool}$ and the resultant normalized cooling air mass flow $m_{cool}$ can be reduced. Analogously, the normalized cooling air pressure ratio $\pi_{cool}$ and, as a result, the normalized cooling air mass flow $m_{cool}$ can be raised by reducing the mechanical rotation speed $n_{mech}$. In a corresponding manner, the cooling air ratios can be controlled for design conditions independently of the compressor inlet temperature, by rotation speed control, and can thus be kept at the design value.

LIST OF REFERENCE SYMBOLS 10, 10', 10" Power station
11, 11' Turbine shafting
12 Gas turbine
13 Compressor
14, 14a, 14b Turbine
15, 15' Combustion chamber
16 Air inlet
17, 17' Fuel supply
18 Generator
19 Shaft
20 Grid connection (frequency-coupled)
21 Electrical grid
22 Exhaust gas outlet
23 Heat recovery steam generator
24 Steam turbine
25 Water/steam cycle
26 Gearbox (mechanical)
27 Decoupling apparatus or variable electronic gearbox
28 Timer
29 Power section
30 Load
31 Controller
32 Switch (bidirectional)
33 Voltage measurement device
34 Current measurement device
35 Control line
36, . . . , 38 Signal line
39 Closed-loop control system
40, 41 Control valve
42 Adjustable compressor guide vanes
43, . . . , 47 Transducer
48 Measurement line (rotation speed)
49 Grid frequency sensor
50 Cooling air supply
51 Generator target rotation speed
G1, . . . , G6 Phase (generator)
L1, . . . , L3 Phase (load)
f Frequency (rotation speed)
P Power
A,B Curve
ZL Intended power
$T_{k1}$ Compressor inlet temperature
$T_{k1d}$ Compressor inlet temperature at design conditions
n* Aerodynamic rotation speed
$n_{mech}$ Mechanical rotation speed
$n_{mech\ d}$ Mechanical rotation speed at design conditions
$n_{min}$ Minimum permissible mechanical rotation speed
$n_{max}$ Maximum permissible mechanical rotation speed
$n_d$ Conventional converter design rotation speed (aerodynamic)

$n_{opt}$ Optimum compressor rotation speed (aerodynamic)
$m_{cool}$ Normalized cooling air consumption
$m_{cool\ d}$ Normalized cooling air consumption at design conditions
$\pi_{cool}$ Normalized cooling air pressure ratio
$\pi_{cool\ d}$ Normalized cooling air pressure ratio at design conditions
$\eta_{comp}$ Compressor efficiency
$\eta_{comp\ d}$ Compressor efficiency at design conditions (conventional design)
$\eta_{opt}$ Optimum compressor efficiency
$\Delta n$ Margin to the compressor surge limit

What is claimed is:

1. A power station having a turbine shafting comprising:
a gas turbine and a generator which is driven directly by the gas turbine, that produces alternating current at an operating frequency and whose output is connected to an electrical grid with a given grid frequency, wherein a variable electronic gearbox is arranged between the generator and the electrical grid to facilitate power from the generator being output to the electrical grid and to control a rotation speed of the gas turbine, wherein the variable electronic gearbox of the gas turbine is configured to impose the rotation speed on the gas turbine via a conversion ratio between a mechanical rotation speed of the gas turbine and the grid frequency via the generator to facilitate the output of power from the generator to the electrical grid and to thereby control the rotation speed of the gas turbine.

2. The power station as claimed in claim 1, wherein the conversion ratio is controllable and is a frequency ratio between the rotation speed of the gas turbine and the grid frequency.

3. The power station as claimed in claim 1, wherein the conversion ratio is not equal to unity.

4. The power station as claimed in claim 1, wherein the conversion ratio is 60 Hz to 50 Hz or the conversion ratio is 50 Hz to 60 Hz.

5. The power station as claimed in claim 1, wherein the conversion ratio is controllable around a design value of 60 Hz to 50 Hz or around a design value of 50 Hz to 60 Hz.

6. The power station as claimed in claim 1, wherein the variable electronic gearbox is a matrix converter.

7. The power station as claimed in claim 6, wherein the matrix converter comprises a plurality of controllable bidirectional switches which are arranged in an m×n matrix and, controlled by a controller, connect m inputs selectively to n outputs, where m is greater than n, and where a first device is provided for determining the polarity of the currents in the inputs, and a second device is provided for determining the polarity of the voltages between the inputs, and where the first and second devices are connected to the controller by signal lines.

8. The power station as claimed in claim 1, wherein the gas turbine is a gas turbine with sequential combustion.

9. A method for operation of a power station having a turbine shafting, comprising:
a gas turbine and a generator which is driven directly by the gas turbine that produces alternating current at an operating frequency and whose output is connected to an electrical grid with a given grid frequency wherein a variable electronic gearbox is arranged between the generator and the electrical grid to facilitate power from the generator being output to the electrical grid and to control a rotation speed of the gas turbine, wherein the variable electronic gearbox of the gas turbine is configured to impose a rotation speed on the gas turbine via a conversion ratio between a mechanical rotation speed of the gas turbine and the grid frequency via the generator, the method comprising:
controlling a mechanical or aerodynamic rotation speed of the gas turbine via use of the conversion ratio between the mechanical rotation speed and the grid frequency to impose the rotation speed on the gas turbine via the variable electronic gearbox to facilitate the output of power from the generator to the electrical grid.

10. The method as claimed in claim 9, wherein the mechanical or aerodynamic rotation speed of the gas turbine is controlled at a constant value.

11. The method as claimed in claim 9, wherein the mechanical or aerodynamic rotation speed of the gas turbine is controlled as a function of at least one parameter of the power station and wherein the conversion ratio is a frequency ratio between the rotation speed of the gas turbine and the grid frequency.

12. The method as claimed in claim 11, wherein the gas turbine has a compressor for compression of combustion air, and the method comprising at least one of:
(i) measuring an outlet pressure of the compressor and wherein the controlling of the mechanical or aerodynamic rotation speed of the gas turbine is also controlled as a function of the compressor outlet pressure, and
(ii) measuring an outlet temperature of the compressor and wherein the controlling of the mechanical or aerodynamic rotation speed of the gas turbine is also controlled as a function of the compressor outlet temperature.

13. The method as claimed in claim 11, wherein an intended power is predetermined for operation of the gas turbine and the mechanical or aerodynamic rotation speed of the gas turbine is controlled as a function of the intended power.

14. The method as claimed in claim 11, comprising at least one of:
measuring the grid frequency of the electrical grid and measuring the second operating frequency; and
wherein the controlling of the mechanical or aerodynamic rotation speed of the gas turbine is also controlled as a function of at least one of the measured grid frequency and the measured second operating frequency.

15. A method for operation of a power station, having a turbine shafting comprising a gas turbine and a generator which is driven directly by the gas turbine, that produces alternating current at an operating frequency and whose output is connected to an electrical grid with a given grid frequency, wherein a variable electronic gearbox is arranged between the generator and the electrical grid the variable electronic gearbox of the gas turbine imposes a rotation speed with a conversion ratio between a mechanical rotation speed of the gas turbine and the grid frequency via the generator, the method comprising:
controlling a mechanical or aerodynamic rotation speed of the gas turbine via the conversion ratio between the mechanical rotation speed and the grid frequency, wherein the mechanical or aerodynamic rotation speed of the gas turbine is controlled as a function of at least one parameter of the power station; and
wherein the gas turbine has a compressor for compression of combustion air, cooling air is taken from the compressor in order to cool components of the gas turbine and the mechanical or aerodynamic rotation speed of the gas turbine is also controlled as a function of at least one cooling air feed condition comprising at least one of (i) a pressure of the cooling air, a temperature of the cooling air, and an amount of the cooling air.

16. The method as claimed in claim 15, wherein the mechanical or aerodynamic rotation speed of the gas turbine is controlled as a function of permissible component temperatures of selected components of the gas turbine, or as a function of permissible emissions.

17. The method as claimed in claim 15, wherein the mechanical rotation speed is controlled in proportion to at least one of: (i) the square root of the compressor inlet temperature and (ii) the compressor inlet pressure in order to keep the aerodynamic rotation speed of the gas turbine at a constant value in the permissible mechanical rotation speed range, and the mechanical rotation speed is controlled at a constant value as soon as mechanical or other limit values are reached.

18. The method as claimed in claim 9, wherein, when at least one of (i) the rotation speed of the shaft section and (ii) rotation speed of the shaft section in combination with the variable electronic gearbox falls within a blocking range, a target rotation speed or the conversion ratio of the variable electronic gearbox is corrected to a value outside the respective blocking range.

19. A power station having a turbine shafting comprising:
a gas turbine which is designed for variations of an aerodynamic rotation speed of less than +/−10%, and a generator which is driven directly by the gas turbine that produces alternating current at an operating frequency and whose output is connected to an electrical grid with a predetermined grid frequency, wherein an electronic decoupling apparatus is arranged between the generator and the electrical grid to facilitate power from the generator being output to the electrical grid, the electronic decoupling apparatus configured to decouple the operating frequency from the grid frequency, and to control a rotation speed of the gas turbine, the decoupling apparatus configured to control a rotation speed of the generator by imposing the rotation speed on the gas turbine that drives the generator to output power to the electrical grid based on a conversion ratio between a mechanical rotation speed of the gas turbine and the grid frequency.

20. The power station as claimed in claim 19, wherein, when on full load and in ISO conditions, the compressor has a surge limit of less than 10% of the aerodynamic rotation speed.

21. The power station as claimed in claim 19, wherein the design pressures for the housing, cooling air cooler and cooling air lines are at least 3% below those which would have to be chosen for a design based on 100% of the mechanical rotation speed.

22. The power station as claimed in claim 19, wherein the gas turbine is established by retrofitting a conventional gas turbine with a new compressor.

23. The power station as claimed in claim 19, wherein the grid frequency is 50 Hz or 60 Hz.

24. The power station as claimed in claim 19, wherein the grid frequency is 60 Hz and the operating frequency is 50 Hz or the grid frequency is 50 Hz and the operating frequency is 60 Hz.

25. The power station as claimed in claim 19, wherein the gas turbine is designed for a power of more than 100 MW, and the electronic decoupling apparatus is a frequency converter in the form of a matrix converter.

26. A power station having a turbine shafting comprising:
a gas turbine and a generator which is driven directly by the gas turbine, to produce alternating current at an operating frequency and whose output is connected to an electrical grid with a predetermined grid frequency, wherein an electronic decoupling apparatus is arranged between the generator and the electrical grid that is configured to decouple the operating frequency from the grid frequency, facilitate power from the generator being output to the electrical grid, and to control a rotation speed of the gas turbine, wherein the gas turbine is designed for a power of more than 100 MW, and the electronic decoupling apparatus is a frequency converter in the form of a matrix converter that comprises a plurality of controllable bidirectional switches which are arranged in a m×n matrix controlled by a controller, m inputs being connected selectively to n outputs, where m is greater than n, and a first device and a second device are connected to the controller by signal lines, the first device is configured to determine the polarity of the currents in the inputs, the second device configured to determine the polarity of the voltages between the inputs, and where the first and second devices are connected to the controller by signal lines; and
wherein the controller of the electronic decoupling apparatus is configured to control aerodynamic rotation speed of the gas turbine via a conversion ratio between aerodynamic rotation speed of the gas turbine and the grid frequency.

27. The power station as claimed in claim 26, wherein the conversion ratio between the aerodynamic rotation speed of the gas turbine and the grid frequency is 5/6 or 6/5.

28. A method for operation of a power station, having a turbine shafting comprising a gas turbine and a generator which is driven directly by the gas turbine, that produce alternating current at an operating frequency and whose output is connected to an electrical grid with a predetermined grid frequency, wherein an electronic decoupling apparatus is arranged between the generator and the electrical grid and is configured to decouple the operating frequency from the grid frequency and control a rotation speed of the gas turbine, wherein the gas turbine is designed for a power of more than 100 MW, and the electronic decoupling apparatus is a frequency converter in the form of a matrix converter, the method comprising:
controlling aerodynamic rotation speed of the gas turbine via the electronic decoupling apparatus to facilitate the output from the generator to the electrical grid and to thereby control the rotation speed of the gas turbine, the controlling of the aerodynamic rotation speed of the gas turbine imposed on the gas turbine via the electronic decoupling apparatus being based on a conversion ratio between the aerodynamic rotation speed of the gas turbine and the grid frequency.

29. The method as claimed in claim 28, wherein the aerodynamic rotation speed of the gas turbine is controlled at a constant value.

30. The method as claimed in claim 28, wherein the control aims are optimized as a function of the gas turbine installation conditions.

31. The method as claimed in claim 28, wherein a mechanical reference rotation speed, by which the target rotation speed of the gas turbine is controlled as a function of a compressor inlet temperature that is corrected as a function of a calorific value of the fuel gas.

32. The method as claimed in claim 28, wherein the aerodynamic rotation speed of the gas turbine is controlled as a function of at least one parameter of the power station.

33. The method as claimed in claim 28, wherein the gas turbine has a compressor for compression of combustion air, the method comprising at least one of:
(i) measuring an outlet pressure of the compressor and measuring an outlet temperature of the compressor; and
wherein the aerodynamic rotation speed of the gas turbine is also controlled as a function of at least one of the measured outlet pressure of the compressor and the measured compressor outlet temperature.

34. The method as claimed in claim 28, wherein an intended power is predetermined for operation of the gas turbine and the aerodynamic rotation speed of the gas turbine is controlled as a function of the intended power.

35. The method as claimed in claim 28, comprising at least one of:
(i) measuring the grid frequency of the electrical grid and
(ii) measuring a second operating frequency; and
wherein the mechanical or aerodynamic rotation speed of the gas turbine is also controlled as a function of at least one of the measured grid frequency and the measured second operating frequency.

36. A method for operation of a power station, having a turbine shafting comprising a gas turbine and a generator which is driven directly by the gas turbine, that produce alternating current at an operating frequency and whose output is connected to an electrical grid with a predetermined grid frequency, wherein an electronic decoupling apparatus is arranged between the generator and the electrical grid and decouples the operating frequency from the grid frequency, wherein the gas turbine is designed for a power of more than 100 MW, and the electronic decoupling apparatus is a frequency converter in the form of a matrix converter, the method comprising:
controlling a mechanical or aerodynamic rotation speed of the gas turbine;
wherein the gas turbine has a compressor for compression of combustion air, the method further comprising:
sending cooling air from the compressor to cool components of the gas turbine, and wherein the mechanical or aerodynamic rotation speed of the gas turbine is also controlled as a function of at least one cooling air feed condition comprising at least one of (i) a pressure of the cooling air, (ii) a temperature of the cooling air, and (iii) an amount of cooling air fed to the gas turbine to cool the components of the gas turbine.

37. The method as claimed in claim 36, wherein the aerodynamic rotation speed of the gas turbine is controlled as a function of permissible component temperatures of selected components of the gas turbine, or as a function of permissible emissions.

38. The method as claimed in claim 36, wherein a mechanical rotation speed is controlled in proportion to at least one of: (i) the square root of the compressor inlet temperature and (ii) the compressor inlet pressure in order to keep the aerodynamic rotation speed of the gas turbine at a constant value in a permissible mechanical rotation speed range, and the mechanical rotation speed is controlled at a constant value as soon as mechanical or other limit values are reached.

39. The method as claimed in claim 28, wherein the aerodynamic rotation speed is reduced in comparison to a full-load rotation speed when the gas turbine is on partial load.

40. The method as claimed in claim 28, wherein when at least one of (i) the rotation speed of the shaft section and (ii) the rotation speed of the shaft section in combination with the electronic decoupling apparatus falls within a blocking range, a target rotation speed is corrected to a value outside the respective blocking range.

41. A method for operation of a power station having a turbine shafting comprising a gas turbine which is designed for variations of an aerodynamic rotation speed of less than +/−10%, and a generator which is driven directly by the gas turbine to produce alternating current at an operating frequency and whose output is connected to an electrical grid with a predetermined grid frequency, wherein an electronic decoupling apparatus is arranged between the generator and the electrical grid, the electronic decoupling apparatus configured to decouple the operating frequency from the grid frequency, control a rotation speed of the gas turbine, and to facilitate power from the generator being output to the electrical grid, the method comprising:
controlling a mechanical or aerodynamic rotation speed of the gas turbine via the electronic decoupling apparatus imposing the rotation speed on the gas turbine based on a conversion ratio between the rotation speed of the gas turbine and the grid frequency to thereby control the rotation speed of the gas turbine and to facilitate the output of power from the generator to the electrical grid.

42. The method as claimed in claim 41, wherein the mechanical or the aerodynamic rotation speed of the gas turbine is controlled at a constant value.

43. The method as claimed in claim 41, wherein the control aims are optimized as a function of the gas turbine installation conditions and the conversion ratio is a frequency ratio between the rotation speed of the gas turbine and the grid frequency.

44. The method as claimed in claim 41, wherein a mechanical reference rotation speed, by which the target rotation speed of the gas turbine is controlled as a function of a compressor inlet temperature is corrected as a function of a calorific value of the fuel gas.

45. The method as claimed in claim 41, wherein the mechanical or aerodynamic rotation speed of the gas turbine is controlled as a function of at least one parameter of the power station.

46. The method as claimed in claim 41, wherein the gas turbine has a compressor for compression of combustion air, the method comprising at least one of:
(i) measuring an outlet pressure of the compressor and (ii) measuring an outlet temperature of the compressor;
wherein the mechanical or aerodynamic rotation speed of the gas turbine is also controlled as a function of at least one of the measured compressor outlet pressure and the measured compressor outlet temperature.

47. The method as claimed in claim 41, wherein an intended power is predetermined for operation of the gas turbine and the mechanical or aerodynamic rotation speed of the gas turbine is controlled as a function of the intended power.

48. The method as claimed in claim 41, comprising:
measuring at least one of (i) the grid frequency of the electrical grid and (ii) a second operating frequency; and
wherein the mechanical or aerodynamic rotation speed of the gas turbine is also controlled as a function of at least one of the measured grid frequency and the measured second operating frequency.

49. A method for operation of a power station having a turbine shafting comprising a gas turbine which is designed for variations of an aerodynamic rotation speed of less than +/−10%, and a generator which is driven directly by the gas turbine, that produce alternating current at an operating frequency and whose output is connected to an electrical grid with a predetermined grid frequency, wherein an electronic decoupling apparatus is arranged between the generator and the electrical grid to decouple the operating frequency from the grid frequency, the method comprising:
controlling a mechanical or aerodynamic rotation speed of the gas turbine; and
wherein the gas turbine has a compressor for compression of combustion air, and the method also comprising:
sending cooling air from the compressor in order to cool components of the gas turbine and wherein the mechanical or aerodynamic rotation speed of the gas turbine is also controlled as a function of at least one of (i) a pressure of the cooling air fed to the gas turbine, (ii) a temperature of the cooling air sent to the gas turbine, and (iii) an amount of the cooling air sent to the gas turbine.

50. The method as claimed in claim 49, wherein the mechanical or aerodynamic rotation speed of the gas turbine is controlled as a function of permissible component temperatures of selected components of the gas turbine, or as a function of permissible emissions.

51. The method as claimed in claim 49, wherein the mechanical rotation speed is controlled in proportion to at least one of (i) the square root of the compressor inlet temperature and (ii) the compressor inlet pressure; in order to keep the aerodynamic rotation speed of the gas turbine at a constant value in a permissible mechanical rotation speed range, and the mechanical rotation speed is controlled at a constant value as soon as mechanical or other limit values are reached.

52. The method as claimed in claim 41, wherein the mechanical rotation speed is reduced in comparison to a full-load rotation speed when the gas turbine is on partial load.

53. The method as claimed in claim 41, wherein when at least one of (i) the rotation speed of the shaft section and (ii) the rotation speed of the shaft section in combination with the electronic decoupling apparatus falls within a blocking range, a target rotation speed is corrected to a value outside the respective blocking range.

* * * * *